United States Patent Office 3,219,709
Patented Nov. 23, 1965

3,219,709
PREPARATION OF MERCAPTAN AND THIO
ETHER COMPOUNDS
Rector P. Louthan, Bartlesville, Okla., assignor to Phillips Petroleum Company, a corporation of Delaware
No Drawing. Filed Dec. 26, 1962, Ser. No. 247,377
6 Claims. (Cl. 260—609)

This invention relates to the preparation of organic sulfur compounds. In another aspect, it relates to an improved process for preparing organic sulfur compounds, namely mercaptans and/or thio-ethers.

Organic sulfur compounds are of considerable industrial importance and processes for obtaining them in high yields by reaction of hydrogen sulfide with ethylenically unsaturated compounds are of considerable utility.

I have now discovered that organic sulfur compounds, namely mercaptans and/or thio-ethers (sulfides) can be readily prepared in high yields by reacting hydrogen sulfide with organic compounds containing ethylenic unsaturation in the presence of catalytic amount of a diamino sulfide.

The ethylenically unsaturated compounds used in this invention to react with hydrogen sulfide can be represented by the following general formula:

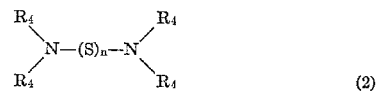

where:

$x$ is an integer from 0 to 5,
$y$ is an integer from 0 to 5,
R is selected from the group consisting of hydrogen and alkyl radicals preferably having 1 to 5 carbon atoms,
$R_1$ and $R_2$ are selected from the group consisting of hydrogen and alkyl radicals preferably having 1 to 5 carbon atoms, and together can form a covalent bond with the proviso that when they form said covalent bond that the sum of $x$ and $y$ is at least 2, and
$R_3$ is selected from the group consisting of hydrogen, alkyl radicals preferably having 1 to 5 carbon atoms, and OR (where R is as defined above).

Representative ethylenically unsaturated compounds coming within the scope of Formula 1 and useful in the practice of this invention include propylene, 1-butene, 2-butene, 2-pentene, 2-hexene, 1-octene, 4-hendecene, 9-eicosene, 3- methyl-2-hexene, 3,5,7-trimethyl-4-decene, 6 - n - butyl - 4 - hexadecene, cyclopentene, cyclohexene, cyclooctene, cyclodecene, cyclohendecene, 4 - n - butyl-cyclohexene, allyl alcohol, methallyl alcohol, 2-methyl-3-hexenyl alcohol, 2-decenyl alcohol, 4-hendecenyl alcohol, 3 - hydroxycyclohexene, 5 - hydroxycyclooctene, 3 - methoxypropene, 4-n-pentoxy-1-butene, 1-ethoxy-2-butene, 11-isopropoxy-4-hendecene, 3-methoxyclopentene, 3-n-butyl-9-n-pentoxycyclohendecene, 4-n-butoxycyclohexene, and the like, including mixtures of such compounds. The total number of carbon atoms in these ethylenically unsaturated compounds can vary, but generally will not exceed 20.

As mentioned hereinbefore, the reaction between the ethylenically unsaturated compound with hydrogen sulfide is carried out in the presence of diamino sulfides.

These diamino sulfides can be represented by the following general formula:

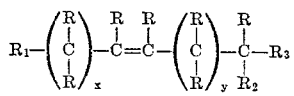

where $R_4$ is selected from the group consisting of alkyl, aryl, alkaryl, aralkyl, and cycloalkyl radicals, preferably having 1 to 8 carbon atoms, and wherein $n$ is an integer of 1 to 2.

Representative diamino sulfides coming within the scope of Formula 2 and useful in the practice of this invention as catalysts include bis(dimethylamino)sulfide, bis(dimethylamino)disulfide, bis(di-n-butylamino)disulfide, bis-(di - isooctylamino)sulfide, bis(diphenylamino)disulfide, bis(dibenzylamino)disulfide, bis(di - p - tolylamino)disulfide, bis(dicyclohexylamino)disulfide, N,N-dicyclohexyl-N'N'-dimethyldiaminodisulfide, N-methyl-N-n-pentyl-N'-n-heptyldiaminosulfide, N-methyl-N-phenyl-N'-cyclohexyl-N'-benzyldiaminodisulfide, N,N-diphenyl-N'N'-dicyclohexyldiaminosulfide, N,N - dimethyl - N' - cyclohexyl-N'-phenyldiaminosulfide, and the like, including mixtures of such compounds.

The amount of the diamino sulfide catalyst used in this invention is, stated functionally, a catalytic amount, i.e., an amount sufficient to catalyze the reaction and increase the yield of organic sulfur compounds; generally, for most preparations of the organic sulfur compounds the amount of such catalyst will be usually within the range of 0.25 to 15 grams per mole, preferably 1 to 10 grams per mole, of the ethylenically unsaturated compound charged to the reaction zone.

It is also within the scope of this invention to carry out the reaction in the presence of a basic compound which has a catalytic effect, in addition to the diamine sulfide. These basic compounds representatively include ammonia, and primary, secondary or tertiary amines. Such basic compounds can be represented by the general formula $N(R_5)_3$ where $R_5$ is hydrogen or an alkyl radical preferably having 1 to 8 carbon atoms. Representative amines useful as basic catalysts in this invention include methylamine, dimethylamine, trimethylamine, ethylamine, diethylamine, triethylamine, di-n-butylaine, tri-n-butylamine, tri-sec-hexylamine, tri-n-octylamine, and the like, including mixtures of such amines. Where such basic catalyst is employed, the amount thereof, stated functionally, to be used in this invention is also a catalytic amount, generally the amount will be in the range of 0.25 to 30 grams per mole, preferably 1 to 20 grams per mole, of the ethylenically unsaturated compound. It should be understood, however, that the use of such basic compound is not essential.

The improved reaction of this invention can be carried out in a manipulative manner like that of the prior art, and can be effected in a batch, intermittent, or continuous manner. The reaction temperature can vary over a wide range, and generally will be in the range of 25 to 150° C., preferably from 50 to 100° C. The amount of hydrogen sulfide used can vary widely, but generally will be in the range from 1 to 10 moles per mole, preferably 1 to 3 moles per mole, of the unsaturated compound. The reaction can be carried out in a closed system and the pressure in the reaction zone generally will be the autogenous pressure developed at the specified temperatures, such pressures generally being in the range from 100 to 1,000 p.s.i. The reaction time can also vary; generally the reaction time will be in the range between 0.5 and 20 hours, preferably 1 to 5 hours, although the reaction time can be outside these ranges.

After reaction is completed to the desired degree, the products of reaction can be recovered by well known procedures. For example, gases can be vented, recovered and recycled, if desired, and the product fractionated, distilled, crystallized or subjected to various other separation and recovery procedures to obtain the desired sulfur compounds. These sulfur compounds will be secondary mercaptans and/or thio-ethers (sulfides) formed according to Markownikoff's rule, wherein the sulfhydryl group, —SH, of the hydrogen sulfide becomes attached to the unsaturated carbon atom of the ethylenically unsaturated compound having the lesser number of hydrogen atoms.

The above-described reaction of hydrogen sulfide with the ethylenically unsaturated compound can be carried out in the presence of solvents or diluents such as water, low molecular weight alcohols, such as methanol, ethanol, n-propanol, isopropanol, n-butanol, and the like, ethers such as diethyl ethers, dioxane, ketones such as acetone, esters such as methyl acetate, and other solvents such as petroleum naphtha, toluene, and the like. Such solvents or diluents are especially useful where $R_3$ of Formula 1 is hydrogen or an alkyl group. In most cases, where $R_3$ of Formula 1 is a hydroxy group or an alkoxy group, such solvents will usually be unnecessary. Where a solvent is used, it will generally be 10 to 75 weight per-alcohol, or 16 moles of hydrogen sulfide and 8 moles of octene-1, were reacted by heating the reaction mixture in a stainless steel, stirred autoclave. Some of the runs were carried out in the presence of bis(dimethylamino)disulfide, according to this invention, and some were not; and some runs were carried out using a solvent, and some were not. These runs and the results obtained are summarized in Table I. The yields given in Table I are based on the unsaturated reactant.

The bis(dimethylamino)disulfide used as a catalyst in some of these runs was prepared by charging 900 grams of a 25 wt. percent aqueous solution of dimethylamine to a 3-liter, 3-necked flask fitted with a dropping funnel, a Dry Ice-acetone condenser and a bottom outlet. Sodium hydroxide was added in small amounts, totaling 220 grams, as reflux allowed, after which 750 ml. of n-pentane was added slowly, as reflux allowed. After charging the n-pentane, 338 grams of $S_2Cl_2$ was added dropwise, as reflux allowed. After all of the $S_2Cl_2$ had been added, the water phase was separated off, and the oil phase was washed with 200 ml. of water. The water phase was again separated off, and the oil phase was flashed at 3 mm. Hg absolute pressure. The overhead from this flash, amounting to 307 grams, was then charged to a packed distillation column and fractionally distilled. One of the overhead cuts, amounting to 244 grams and having a boiling point of 92° C. at 5 mm. Hg absolute pressure and a refractive index $n_D^{20}$ of 1.5158, was employed as a catalyst in the runs set forth in Table I.

*Table 1*

| Run | Unsaturated reactant | Solvent used | | Amt. of disulfide catalyst used, g.[1] | Amt. of ammonia used, g.[1] | Reaction temp., °C. | Reaction time, hrs. | Yield of sulfur products, mole percent | | |
|---|---|---|---|---|---|---|---|---|---|---|
| | | Name | Amt., g.[1] | | | | | Mercaptan | Sulfide | Total |
| 1 | Allyl alcohol | None | 0 | 0 | 0 | 85 | 5 | 1.4 | 8.9 | 10.3 |
| 2 | ----do---- | ----do---- | 0 | 3 | 0 | 50 | 5 | 16.5 | 11.3 | 27.8 |
| 3 | ----do---- | ----do---- | 0 | 3 | 0 | 70 | 5 | 29.5 | 36.9 | 66.4 |
| 4 | ----do---- | ----do---- | 0 | 3 | 0 | 85 | 5 | 32.5 | 48.8 | 81.3 |
| 5 | ----do---- | ----do---- | 0 | 1 | 0 | 85 | 5 | 18.4 | 57.3 | 75.7 |
| 6 | ----do---- | ----do---- | 0 | 3 | 0 | 85 | 1.5 | 29.5 | 44.3 | 73.8 |
| 7 | Octene-1 | ----do---- | 0 | 3 | 0 | 85 | 5 | | | [2] 10 |
| 8 | ----do---- | Isopropanol | 112 | 3 | 0 | 85 | 5 | 6.6 | 21.9 | 28.5 |
| 9 | ----do---- | Methanol | 112 | 3 | 0 | 85 | 5 | 7.7 | 26.2 | 33.9 |
| 10 | ----do---- | ----do---- | 224 | 3 | 0 | 100 | 5 | 9.7 | 37.1 | 46.8 |
| 11 | ----do---- | n-Propanol | 112 | 3 | 0 | 85 | 5 | 7.0 | 33.2 | 40.2 |
| 12 | ----do---- | ----do---- | 112 | 3 | 0 | 100 | 5 | 8.2 | 47.3 | 55.5 |
| 13 | ----do---- | ----do---- | 112 | 15 | 0 | 100 | 5 | 6.6 | 64.8 | 71.4 |
| 14 | ----do---- | Ethanol | 224 | 3 | 17 | 100 | 5 | 23.0 | 33.8 | 56.8 |

[1] Amount given is on the basis of 1 mole of the unsaturated reactant. [2] Approximate.

cent of the solution of the unsaturated compound in the solvent.

The diamino sulfide catalysts used in the practice of this invention are known compounds as is their preparation. One suitable method for preparing these diamino sulfides is by reaction of two moles of a secondary amine having the formula $(R_4)_2NH$ with either $SCl_2$ or $S_2Cl_2$, depending upon whether the monosulfide or disulfide product is desired. For example, reaction of dimethylamine with sulfur monochloride in the presence of a basic material such as caustic yields bis(dimethylamino)disulfide, this particular compound being the preferred diaminosulfide catalyst used in this invention.

The utility of sulfur compounds, such as those prepared according to this invention, is well known, and their uses representatively include pesticides, dyestuff intermediates, pharmaceuticals (such as anti-radiation drugs), inhibitors for enzymatic deterioration of plants, and rubber polymerization chemicals, such as polymerization modifiers.

The following example further illustrates the objects and advantages of this invention, but it should be understood that the various reactants, amounts, temperatures, pressures, and other conditions recited in this example should not be construed so as to limit this invention.

EXAMPLE

A series of runs was carried out in which, in each case, either 24 moles of hydrogen sulfide and 12 moles of allyl The data of Table I show that significant improvement in the yield of sulfur compounds is obtained when, according to the practice of this invention, the reaction of the ethylenically unsaturated compound with hydrogen sulfide is carried out with a diamino sulfide catalyst.

Various modifications and alterations of this invention will become apparent to those skilled in the art from the foregoing description without departing from the scope and spirit of this invention and it should be understood that this invention is not to be limited to that set forth herein for illustrative purposes.

I claim:
1. A process for preparing mercaptans and thio ether compounds, which process comprises reacting organic compounds containing ethylenic unsaturation with hydrogen sulfide in the presence of a catalytic amount of a diamino sulfide, said organic compounds containing ethylenic unsaturation having the formula:

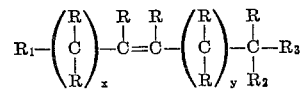

where:
$x$ and $y$ are integers from 0 to 5,
R is selected from the group consisting of hydrogen and alkyl, $R_1$ and $R_2$ are selected from the group consisting of hydrogen and alkyl radicals, and together can form a covalent bond with the proviso that when they form said covalent bond that the sum of $x$ and $y$ is at least 2, and $R_3$ is selected from the group consisting of hydrogen, alkyl, and OR, said diamino sulfide having the general formula:

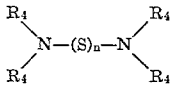

where:

$R_4$ is selected from the group consisting of alkyl, phenyl, alkylphenyl, phenylalkyl, and cycloalkyl, containing from 1–8 carbon atoms, and wherein $n$ is an integer of 1 to 2, and recovering said organic sulfur compounds from the resulting reaction mixture.

2. The process according to claim 1, wherein the catalytic amount of said diamino sulfide is in the range of 0.25 to 15 grams per mole of said organic compound having ethylenic unsaturation.

3. The process according to claim 2 wherein said organic compound containing ethylenic unsaturation is allyl alcohol and said diamino sulfide is bis(dimethylamino) disulfide.

4. The process according to claim 2 wherein said organic compound containing ethylenic unsaturation is octene-1 and said diamino sulfide is bis(dimethylamino)disulfide.

5. The process according to claim 2, wherein said reaction is carried out in the presence of from 0.25 to 30 grams/mol. of said organic compound having ethylenic unsaturation of a basic compound having the formula $N(R_5)_3$, where $R_5$ is selected from the group consisting of hydrogen and alkyl radicals having 1–8 carbon atoms.

6. A process according to claim 5, wherein said organic compound containing ethylenic unsaturation is octene-1, said diamino sulfide is bis(dimethylamino)disulfide and said basic compound is ammonia.

References Cited by the Examiner
UNITED STATES PATENTS 2,061,019  11/1936  Carter et al.
2,137,584  11/1938  Ott _____ 260—399

CHARLES B. PARKER, *Primary Examiner.*

DANIEL D. HORWITZ, *Examiner.*